(12) United States Patent
Tschudin et al.

(10) Patent No.: US 9,170,139 B2
(45) Date of Patent: Oct. 27, 2015

(54) MAGNETO INDUCTIVE FLOW MEASURING DEVICE AND METHOD FOR INSTALLING A MAGNET SYSTEM IN THE MANUFACTURE OF A MAGNETO INDUCTIVE, FLOW MEASURING DEVICE

(71) Applicant: Endress + Hauser Flowtec AG, Reinach (CH)

(72) Inventors: Beat Tschudin, Reinach (CH); Simon Stingelin, Zullwil (CH); Roger Kerrom, Lorrach (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 101 days.

(21) Appl. No.: 14/055,076

(22) Filed: Oct. 16, 2013

(65) Prior Publication Data

US 2014/0109685 A1    Apr. 24, 2014

(30) Foreign Application Priority Data

Oct. 19, 2012  (DE) ............... 20 2012 104 036 U

(51) Int. Cl.
*G01F 1/58* (2006.01)

(52) U.S. Cl.
CPC . *G01F 1/586* (2013.01); *G01F 1/58* (2013.01)

(58) Field of Classification Search
CPC ................................... G01F 1/58; F17D 1/16
USPC ............................. 73/861.11, 861.12; 137/13
See application file for complete search history.

(56) References Cited

U.S. PATENT DOCUMENTS

| 4,641,537 | A | * | 2/1987 | Hansen et al. ............. 73/861.12 |
| 4,726,236 | A | | 2/1988 | Wada |
| 4,736,635 | A | | 4/1988 | Murase |
| 5,125,276 | A | | 6/1992 | Wada |
| 6,321,766 | B1 | * | 11/2001 | Nathenson ....................... 137/13 |
| 6,453,756 | B2 | | 9/2002 | van Willigen |
| 2011/0284656 | A1 | * | 11/2011 | Kambayashi et al. ..... 239/102.2 |
| 2013/0307633 | A1 | * | 11/2013 | Onishi et al. .................. 331/155 |

FOREIGN PATENT DOCUMENTS

| DE | 1911556 | 9/1970 |
| DE | 3528243 A1 | 2/1987 |
| DE | 3787183 T2 | 12/1993 |
| DE | 19958285 A1 | 6/2001 |
| DE | 102011079351 A1 | 1/2013 |
| WO | 2013010715 A1 | 1/2013 |

OTHER PUBLICATIONS

Jun. 24, 2013 German Search Report, German Patent Office, Munich, Germany.

* cited by examiner

*Primary Examiner* — Jewel V Thompson
(74) *Attorney, Agent, or Firm* — BACON & THOMAS, PLLC

(57) ABSTRACT

A magneto inductive, flow measuring device comprising a measuring tube and at least one magnet system arranged on the measuring tube. The magnet system has two coil systems, which lie opposite one another on or in the measuring tube, and each coil system includes at least one pole shoe. A first of the two coil systems is connected via at least one flux return, sheet metal length with the second or an additional coil system, and wherein each of the at least two coil systems has at least two coils, which are arranged peripherally distributed relative to the measuring tube on the pole shoe.

15 Claims, 2 Drawing Sheets

MAGNETO INDUCTIVE FLOW MEASURING DEVICE AND METHOD FOR INSTALLING A MAGNET SYSTEM IN THE MANUFACTURE OF A MAGNETO INDUCTIVE, FLOW MEASURING DEVICE

TECHNICAL FIELD

The present invention relates to a magneto inductive, flow measuring device as defined in the preamble of the claim 1 and to a method for installing a magnet system in the manufacture of a magneto inductive, flow measuring device.

BACKGROUND DISCUSSION

The construction of a magneto inductive, flow measuring device of the field of the invention with modular construction composed of a coil system with a pole shoe and corresponding flux return sheets is described, for example, in German patent DE 10 2011 079 351.8. Such modular constructions are attractive due, among other things, to their simple mounting around the measuring tube.

Known are magnet systems, which provide a dividing of a coil arrangement, but use a different structural construction and produce different magnetic fields. For example, U.S. Pat. No. 4,726,236 B discloses a magnet system with a cylindrical core and a coil arrangement composed of a total of four coils wound on the core. In such case, the coil core is embodied to go all the way around. German patent DE 1 648 143 discloses coil pairs for producing a uniform magnetic field. Also in this case, the coil core is composed of an encircling ring with inwardly leading, pencil-shaped structures, around which the coils are arranged. DE 1 911 556 discloses a multi-coil arrangement using flat coils for lessening the dimensions of the coil arrangement. All these documents, however, show no modular construction with pole shoes and flux return sheets.

SUMMARY OF THE INVENTION

An object of the present invention is to provide a compact magneto inductive, flow measuring device with an easily mounted magnet system and a corresponding method for its installation.

This object is achieved by a magneto inductive, flow measuring device includes a measuring tube and at least one magnet system arranged on the measuring tube, wherein the magnet system has two coil systems, which lie opposite one another on or in the measuring tube, wherein each coil system includes at least one pole shoe and wherein a first of the two coil systems is connected via at least one flux return, sheet metal length with the second or an additional coil system. According to the invention, each of the at least two coil systems has at least two coils, which are arranged peripherally distributed, especially circumferentially distributed, relative to the measuring tube on the pole shoe. Peripherally distributed means that the coils are arranged on a line along the periphery of the measuring tube.

Through this particular arrangement of the coils on the pole shoe, it is possible to improve a previously modularly constructed magnet system such that it has a more compact construction, and its uncomplicated mounting on a measuring tube leads to such compact construction.

Thus, a smaller dimensioning of the housing can be implemented. The housing can additionally be arranged close to the magnet system. Additionally, the coils and the coil core can be dimensioned smaller. Associated with the minimizing of the dimensions is also a not insignificant weight reduction, which likewise brings about a reduction of costs.

It is advantageous when the at least two coil systems form a magnetic field, wherein at least two coils and the pole shoe form one pole of the magnetic field and the magnetic field forms at least in the region of the pole shoe between the two coils. Especially, it is advantageous when the at least two coil systems form a magnetic field, wherein at least two coils and the pole shoe form a pole of the magnetic field, which extends over the entire width of the pole shoe. In such case, the width of the pole shoe is the line of separation between two end points, which are arranged peripherally distributed on the measuring tube.

It is advantageous when the magnet system has a modular construction, wherein individual components are arranged peripherally distributed around the measuring tube and form an annular arrangement closed around the measuring tube, wherein the components comprise at least the pole shoes of the coil systems, the coils of the coil systems and the flux return, sheet metal lengths. Because of the annular arrangement in the mounted state, no additional securement means are required. A corresponding annular arrangement is, in such case, not exclusively embodied as a circular shape, but, instead, can be embodied especially also in a polygonal form, especially as a hexagonal shape or an octagonal shape.

It is advantageous when the pole shoes of the coil systems and the flux return, sheet metal lengths, in each case, have lateral segments, which overlap one another. In this way, the size of the magnet system can be adjusted to match different measuring tube diameters.

It is advantageous when, in each case, at least one coil of a coil system connects a lateral segment of a pole shoe with a lateral segment of a flux return, sheet metal length. By these connections only at lateral segments, material can be saved, as compared, for example, in the case of a completely encircling flux return, sheet metal length.

In an additional, advantageous, structural simplification, a coil of a coil system includes a coil core, which at the same time serves as connecting element between the pole shoe and the flux return, sheet metal length. Since a magnet system frequently also vibrates somewhat, it is advantageous in the case of a modular construction, to use as few connecting elements as possible. Because the iron core is at the same time a connecting element, a supplemental connecting element, for example, screws or welded connections, can be omitted.

Other than in the state of the art not within the field of the invention, the pole shoe can lie, at least in certain regions, against the measuring tube. The flux return, sheet metal length can be spaced from the pole shoe in the radial direction with respect to a measuring tube axis.

The separation between the flux return, sheet metal length and the pole shoe is preferably bridged by the coils, so that vibrations of the coil are prevented.

A further advantage with positive effect for compact construction and saving of material for the magneto inductive measuring device is provided to the extent that the flux return, sheet metal lengths extend at less than 50%, preferably less than 40%, especially less than 35%, around the periphery of the measuring tube.

It is advantageous when at least one of the pole shoes and/or the flux return, sheet metal lengths has elongated holes for positioning and then locking the magnet system around the measuring tube.

The pole shoe and/or the flux return, sheet metal length are preferably embodied terminally angled with a central region and two lateral, angled segments which are angled, in each case, at an angle of more than 10° relative to the central region and the measuring tube. The central region can be flat or matched to the shape of the measuring tube. The terminal segments, respectively the flanks, of the pole shoe are, however, angled toward the measuring tube, so that the pole shoe does not completely correspond to the rounding of the tube. Such a pole shoe is simply manufacturable. Moreover, the angled embodiment of the pole shoe means that tolerances, especially tube tolerances, can be accommodated.

The flux return, sheet metal lengths are advantageously arranged in a plane with the coils, which plane extends perpendicularly to the circumference of the tube, for lessening cross talk with a housing, respectively for lessening magnetic in-coupling into the housing. In this way, the housing can be brought yet closer to the magnet system.

A method of the invention for installing a magnet system in the manufacture of a magneto inductive, flow measuring device, includes the steps as follows:
a) providing components comprising at least two pole shoes, two flux return, sheet metal lengths and four coils;
b) arranging the components around a measuring tube, wherein, in each case, a pole shoe and a flux return, sheet metal length are terminally connected with a coil in such a manner that an annular arrangement around the measuring tube results; and
c) affixing the components around the measuring tube.

A corresponding annular arrangement need, in such case, not be exclusively embodied as a circular shape but can, instead, be embodied especially also in a polygonal form, especially as a hexagonal shape or an octagonal shape.

Especially, there results, in fashion other than in the case of previous multi-coil arrangements not of the field of the invention, an annular arrangement only after the arranging of the components around the measuring tube. In other words, this annular arrangement first appears, once the components have been arranged.

BRIEF DESCRIPTION OF THE DRAWINGS

The invention will now be explained in greater detail based on an example of an embodiment set forth in the appended drawing, the figures of which show as follows.

DETAILED DISCUSSION IN CONJUNCTION WITH THE DRAWINGS

Magneto inductive flow measuring devices for volumetric flow measurement utilize the principle of electrodynamic induction and are known from a large number of publications. Charge carriers contained in a medium moving perpendicularly to a magnetic field induce a measurement voltage in measuring electrodes arranged essentially perpendicularly to the flow direction of the medium and perpendicularly to the direction of the magnetic field. The measurement voltage induced in the measuring electrodes is proportional to the flow velocity of the medium averaged over the cross section of the measuring tube, thus proportional to the volume flow rate. If the density of the medium is known, the mass flow in the pipeline, respectively in the measuring tube, can be determined. The measurement voltage is usually registered via a measuring electrode pair, which, relative to the coordinate along the measuring tube axis, is arranged in the region of maximum magnetic field strength and where, thus, the maximum measurement voltage is to be expected. The electrodes are usually coupled galvanically with the medium; there are, however, also magneto inductive, flow measuring devices having contactless, capacitively coupling electrodes.

The measuring tube can be manufactured either of an electrically conductive, non-magnetic material, e.g. stainless steel, or of an electrically insulating material. If the measuring tube is manufactured of an electrically conductive material, then it must be lined in the region coming in contact with the medium with a liner of an electrically insulating material. The liner is composed, depending on temperature and medium, for example, of a thermoplastic, a thermosetting or an elastomeric, synthetic material. There are, however, also magneto inductive, flow measuring devices having a ceramic lining.

An electrode can essentially be subdivided into an electrode head, which comes in contact at least partially with a medium flowing through the measuring tube, and an electrode shaft, which extends almost completely in the wall of the measuring tube.

The electrodes are, besides the magnet system, the central components of a magneto inductive, flow measuring device. In embodying and arranging the electrodes, it is to be heeded that they can be assembled as simply as possible in the measuring tube and that subsequently in measurement operation no sealing problems occur; moreover, the electrodes should be distinguished by a sensitive and simultaneously low-disturbance registering of the measurement signal.

Besides the measuring electrodes serving for registering a measurement signal, often additional electrodes are installed in the measuring tube in the form of reference- or grounding electrodes, which serve to measure an electrical reference potential or to detect partially filled measuring tubes or to register the temperature of the medium by means of an installed temperature sensor.

Figure 1:
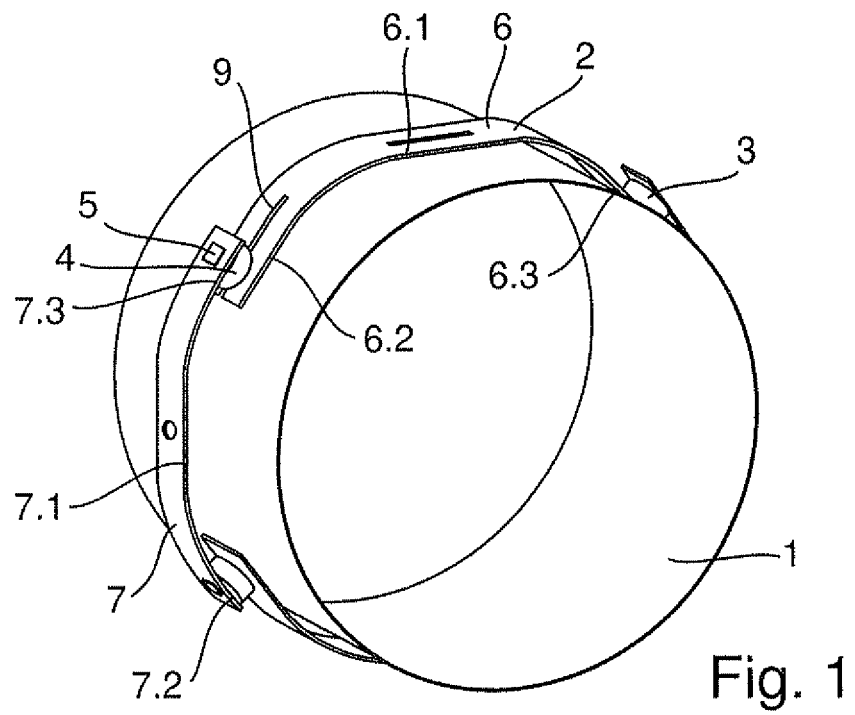
FIG. 1 is a schematic, perspective view of a magneto inductive, flow measuring device of the invention.

FIG. 1 shows a magneto inductive, flow measuring device of the invention, including a measuring tube 1 and two thereon arranged, coil systems 2 of a magnet system. Each coil system 2 includes at least two coils 3 and 4 distributed peripherally on the measuring tube. Each of these coils 3 and 4 includes preferably a metal coil core 5, which is oriented perpendicularly to the measuring tube axis. The coils are wound about a coil body, whose axis is likewise oriented perpendicularly to the measuring tube axis. In such case, each coil connects two sheet metal segments with one another. In the case of one sheet metal segment, it is preferably, however not absolutely, a so-called pole shoe 6, which, at least in certain regions, rests against the measuring tube 1. The pole shoe serves, in such case, to provide defined emerging and distribution of magnetic field lines of the coil system 2. The flow measuring device includes additionally a magnetic flux return in the form of a flux return, sheet metal length 7 for guiding the magnetic field produced by the coil system. This flux return, sheet metal length forms the second sheet metal segment. Not shown in FIG. 1 are the two measuring electrodes on the tube inner wall perpendicular to the magnetic field, which register the voltage produced in the case of flowing, measured substance. The induced voltage is proportional to the flow velocity and therewith to the volume flow.

The individual elements of the magnet system will now be explained in greater detail.

In the present case, the pole shoe 6 performs not only the guiding of the magnetic field produced in a coil, but also especially the merging and dividing of the two magnetic fields produced by the coils of the coil system. While, in the state of the art, a coil arranged centrally at the midpoint of the pole shoe was utilized for producing the magnetic field, magnetic field production here occurs in coils arranged preferably symmetrically on the pole shoe. The pole shoe enables the forming of a magnetic field perpendicular to the flow direction of the medium and distributed over the entire width of the pole shoe. The pole shoe comprises a magnetizable material and is one-piece in FIG. 1; it can, however, also be composed of a plurality of single pieces of sheet metal, so that eddy current effects are lessened.

Each pole shoe 6 with its peripherally distributed coils 3 and forms, thus, one pole of the magnetic field, which arises between each reversal of polarity.

The variant of an embodiment of a pole shoe 6 shown in FIG. 1 is angled. It includes preferably a central region 6.1, which has a first plane preferably perpendicular to the surface normal of the tube wall. Deviation from this perpendicular arrangement can be up to 5°.

Alternatively to being planar, the central region can also have a curvature, preferably of less than 20°, especially preferably less than 10°, especially less than 5°.

Proceeding from the central planar region 6.1 illustrated in FIG. 1, the pole shoe has two lateral segments 6.2 and 6.3. These lateral segments are preferably embodied symmetrically to one another. Each of the lateral segments has a second plane, each preferably perpendicular to a surface normal of the tube wall. Deviation from this perpendicular arrangement can be up to 5°. The pole shoe is provided with elongated holes 9 for accommodating and arrangement of the at least two coils of a coil system. The coils can still be varied, respectively adjusted, along the periphery of the tube wall. After the adjusting, a locking of the coils 3 and 4 to the lateral segments 6.2 and 6.3 of the pole shoe can occur. A corresponding locking of the coils can occur especially through an affixing of the coil core 5 of a coil 3 or 4 to the pole shoe.

Figure 2:
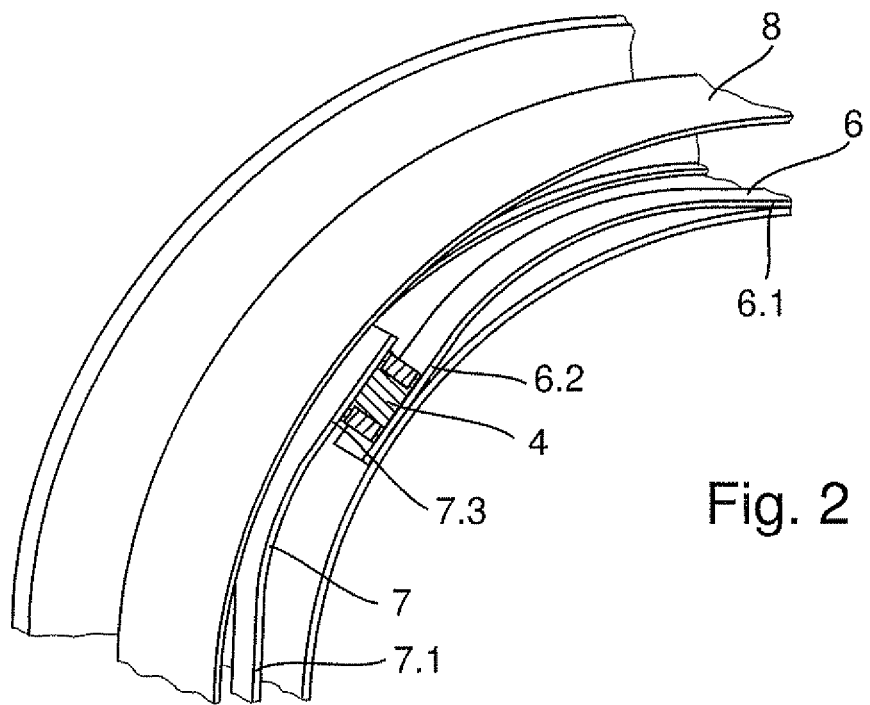
FIG. 2 is a detail view of the magnet system of the magneto inductive, flow measuring device, including a housing.

The arrangement composed of the pole shoe 6, the coil 3 or 4 with the respective coil core 5 and the flux return, sheet metal length 7 is presented in greater detail in FIG. 2.

In such case, the arrangement is preferably embodied in such a manner that the coil core extends between two mutually parallel, planar surfaces of the pole shoe 6 and the flux return, sheet metal length 7. One of these surfaces is formed by an above described, lateral segment 6.2 or 6.3 of the pole shoe 6. The second surface is formed by a lateral segment 7.2 of the flux return, sheet metal length 7, whose construction is explained below in greater detail.

The flux return, sheet metal length includes, analogously to the pole shoe, a central planar region 7.1 and two lateral segments 7.2 and 7.3. The central region 7.1 has a first plane preferably perpendicular to a surface normal of the tube wall. Deviation from this perpendicular arrangement can be up to 5°.

Alternatively to a plane, the central region 7.1 can also have a curvature, preferably of less than 20°, especially preferably less than 10°, especially less than 5°.

The angled lateral segments 7.2 and 7.3 of the flux return, sheet metal length 7 are embodied preferably symmetrically to one another. Each of the lateral segments has a second plane, each preferably perpendicular to a surface normal of the tube wall. Deviation from this perpendicular arrangement can be up to 5°. For easier installation, the coils 3 and 4 can be secured to the flux return, sheet metal length 7 already before the assembly of the magneto inductive, flow measuring device.

On the whole, the magneto inductive flow meter of the invention is distinguished by its modular construction, which enables a fast and uncomplicated installation, and, in given cases, deinstallation, of the magnet system on the measuring tube.

FIG. 2 shows additionally a housing 8, which completely surrounds the aforementioned arrangement, so that external disturbances can be excluded.

A corresponding evaluation unit for electronic evaluation of the measured data is present and can, depending on type of construction, be arranged removed from the housing, on the housing or in the housing.

Figure 3:
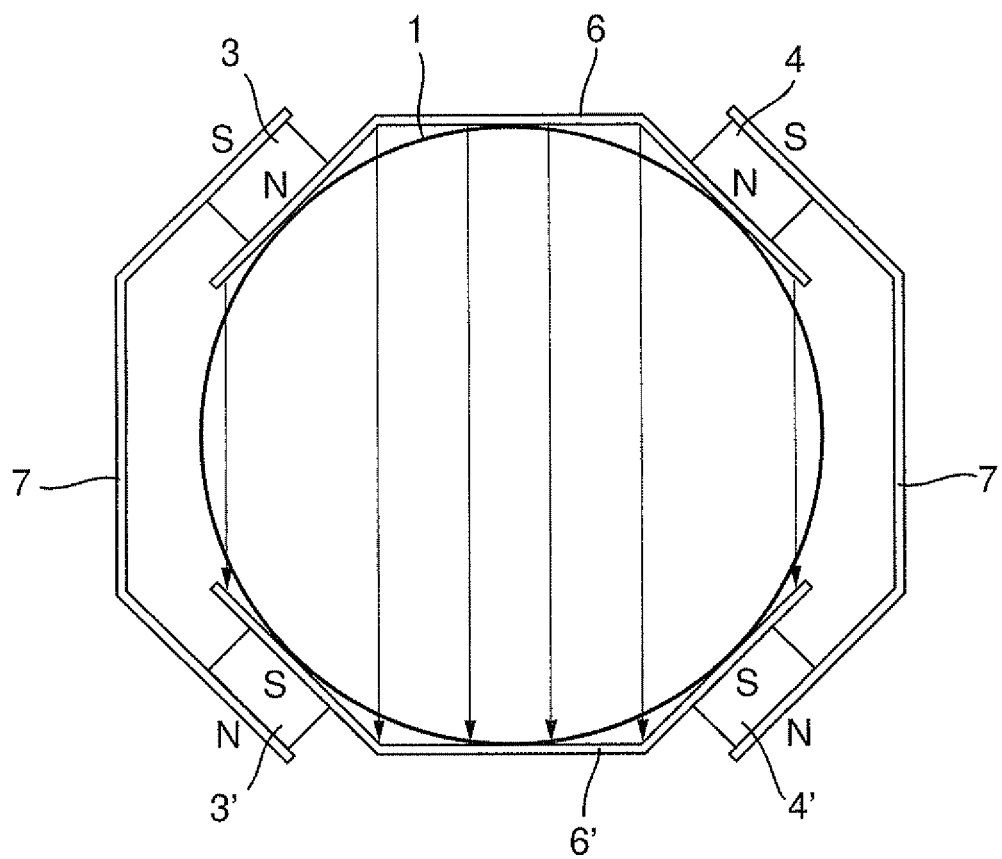
FIG. 3 is a schematic illustration of magnetic flux direction in the magneto inductive, flow measuring device.

FIG. 3 shows a possible magnetic flux direction in the magneto inductive, flow measuring device. In such case, the coils 3 and 4 of a respective coil system are equally poled, i.e. the two coils of the upper coil system, which are arranged in FIG. 3 on the upper pole shoe 6, have on the side facing the measuring tube 1 a north pole. Thus, the entire pole shoe 6 is north poled.

Correspondingly, the two lower coils 3' and 4' on the lower pole shoe 6' have, in each case, a south pole on the side facing the measuring tube. Thus, the lower pole shoe 6' is south poled.

As indicated in FIG. 3, the magnetic field extends over the entire width of the pole shoe 6 (thus in the region between the coils 3 and 4) and, moreover, the coils have, in such case, preferably the same magnetic flux density.

Optionally, there can be arranged between the one of the coils 3 or 4 and the one of the pole shoes 6 an oscillation damping component or an oscillation damping coating.

The invention claimed is:

1. A magneto inductive flow measuring device, comprising:
    a measuring tube; and
    at least one magnet system arranged on the measuring tube, wherein:
    said at least one magnet system has two coil systems, which lie opposite one another on or in said measuring tube, each of said coil system includes at least one pole shoe;
    a first of said two coil systems is connected via at least one flux return, sheet metal length with the second or an additional coil system; and
    each of said at least two coil systems has at least two coils, which are arranged peripherally distributed relative to said measuring tube on said at least one pole shoe.

2. The magneto inductive flow measuring device as claimed in claim 1, wherein:
    said at the at least two coil systems form a magnetic field;
    said at least two coils and said at least one pole shoe form a pole of the magnetic field and the magnetic field forms at least over the region of said at least one pole shoe between said two coils.

3. The magneto inductive flow measuring device as claimed in claim 1, wherein:
    said at least one magnet system has a modular construction, wherein individual components are arranged peripherally distributed around said measuring tube and in the mounted state form an annular arrangement closed around said measuring tube; and
    said components comprise at least said pole shoes of said coil systems, the coils of said coil systems and said flux return, sheet metal lengths.

4. The magneto inductive flow measuring device as claimed in claim 1, wherein:
    said pole shoes of said coil systems and said flux return, sheet metal lengths have, in each case, lateral segments, which overlap one another.

5. The magneto inductive flow measuring device as claimed in claim 4, wherein:
  each case, at least one coil of one of said coil systems connects, in each case, a lateral segment of said pole shoe with a lateral segment of said flux return, sheet metal length.

6. The magneto inductive flow measuring device as claimed in claim 5, wherein:
  said coil of said coil system has a coil core, which serves at the same time as a connecting element between said pole shoe and said flux return, sheet metal length and which is oriented perpendicular to the measuring tube axis.

7. The magneto inductive flow measuring device, as claimed in claim 1, wherein:
  said flux return, sheet metal lengths are arranged in a plane with said coils, which plane extends perpendicularly to the circumference of said measuring tube, for lessening in-coupling into a housing.

8. The magneto inductive flow measuring device as claimed in claim 1, wherein:
  said flux return, sheet metal length is spaced from said pole shoe in the radial direction from a measuring tube axis.

9. The magneto inductive flow measuring device as claimed in claim 1, wherein:
  the separation between said flux return, sheet metal length and said pole shoe is bridged by said coils.

10. The magneto inductive flow measuring device as claimed in claim 1, wherein:
  said flux return, sheet metal lengths extend at less than 50% around the periphery of said measuring tube.

11. The magneto inductive flow measuring device as claimed in claim 1, wherein:
  at least one of said pole shoes and/or said flux return, sheet metal lengths has one or a plurality of elongated holes for positioning and locking said at least one magnet system around said measuring tube.

12. The magneto inductive flow measuring device as claimed in claim 1, wherein:
  an oscillation damping component or an oscillation damping coating is arranged between the one of said coils and the one of said pole shoes.

13. The magneto inductive flow measuring device as claimed in claim 1, wherein:
  said pole shoe and/or said flux return, sheet metal length are/is embodied terminally angled with a central region and two laterally angled segments, each of which has an angle of greater than 10° relative to the central region and said measuring tube.

14. The magneto inductive flow measuring device as claimed in claim 1, wherein:
  said flux return, sheet metal lengths extend at less than 40% around the periphery of said measuring tube.

15. The magneto inductive flow measuring device as claimed in claim 1, wherein:
  said flux return, sheet metal lengths extend at less than 35% around the periphery of said measuring tube.

* * * * *